US012273984B2

(12) United States Patent
Kimrey, Jr.

(10) Patent No.: US 12,273,984 B2
(45) Date of Patent: Apr. 8, 2025

(54) RADIO FREQUENCY HEATING SYSTEM

(71) Applicant: Harold Dail Kimrey, Jr., Knoxville, TN (US)

(72) Inventor: Harold Dail Kimrey, Jr., Knoxville, TN (US)

( * ) Notice: Subject to any disclaimer, the term of this patent is extended or adjusted under 35 U.S.C. 154(b) by 189 days.

(21) Appl. No.: 17/848,043

(22) Filed: Jun. 23, 2022

(65) Prior Publication Data

US 2022/0322504 A1 Oct. 6, 2022

Related U.S. Application Data

(63) Continuation of application No. 16/427,881, filed on May 31, 2019, now Pat. No. 11,412,586, which is a continuation of application No. 14/921,650, filed on Oct. 23, 2015, now Pat. No. 10,314,121.

(60) Provisional application No. 62/067,976, filed on Oct. 23, 2014.

(51) Int. Cl.
*H05B 6/70* (2006.01)
*H05B 6/60* (2006.01)
*H05B 6/78* (2006.01)

(52) U.S. Cl.
CPC ............... *H05B 6/707* (2013.01); *H05B 6/60* (2013.01); *H05B 6/701* (2013.01); *H05B 6/78* (2013.01)

(58) Field of Classification Search
CPC .......... H05B 6/60; H05B 6/701; H05B 6/707; H05B 6/78
USPC ....... 219/690, 678, 687, 688, 696, 697, 700, 219/701, 709, 717, 726, 745, 746, 757, 219/762; 99/324, 421 R, 423, 443 R, 99/443 C; 426/237, 241, 243
See application file for complete search history.

(56) References Cited

U.S. PATENT DOCUMENTS 3,571,551 A 3/1971 Ogasawara et al.
4,633,875 A 1/1987 Turner
5,055,180 A 10/1991 Klaila
5,487,873 A 1/1996 Bridges et al.
5,609,820 A 3/1997 Bridges et al.
5,914,014 A 6/1999 Kartchner
6,187,988 B1 2/2001 Cha
9,380,650 B2 * 6/2016 Kimrey, Jr. .............. H05B 6/80
2013/0240511 A1 9/2013 Kimrey, Jr.
2016/0183333 A1 * 6/2016 Mohammed ............ A23L 3/045 219/688

FOREIGN PATENT DOCUMENTS

CN 2119628 U 10/1992
CN 104005745 B 8/2014
CN 104105239 B 10/2014
KR 10-1412903 B1 * 6/2014
TW 200803633 A 1/2008
(Continued)

OTHER PUBLICATIONS

Search Report and Written Opinion dated Jan. 19, 2016 for related PCT Patent Application No. PCT/US2015/057190, filed Oct. 23, 2015, 13 pages.

(Continued)

*Primary Examiner* — Quang T Van
(74) *Attorney, Agent, or Firm* — Hovey Williams LLP; Kameron D. Kelly

(57) ABSTRACT

A radio frequency (RF) heating system and process for rapidly and uniformly heating a plurality of articles on a convey line.

14 Claims, 13 Drawing Sheets

(56) References Cited

FOREIGN PATENT DOCUMENTS

| | | |
|---|---|---|
| WO | 95/10403 | 4/1995 |
| WO | 2010032478 A1 | 3/2010 |

OTHER PUBLICATIONS

European Search Report dated Jun. 8, 2018 for related European Patent Application No. 15852694.7; 6 pages.
Office Action for related Indian Patent Application No. 201717013335, dated Jan. 24, 2020, 7 pages.
Office Action for related Chinese Patent Application No. 201580057323.7, dated Jan. 16, 2020, 9 pages.

* cited by examiner

RADIO FREQUENCY HEATING SYSTEM

CROSS-REFERENCE TO RELATED APPLICATION

This application is a continuation patent application of U.S. Continuation patent application Ser. No. 16/427,881, which was filed on May 31, 2019, which claims priority to U.S. patent application Ser. No. 14/921,650, which was filed on Oct. 23, 2015, which claims the priority benefit of U.S. Provisional Patent Application Ser. No. 62/067,976, filed Oct. 23, 2014, the entire disclosures of which are incorporated herein by reference.

FIELD OF THE INVENTION

The present invention relates generally to systems that use radio frequency (300 KHz-300 MHz) energy to heat articles.

BACKGROUND OF THE INVENTION

Electromagnetic radiation is a known mechanism for delivering energy to an object. The ability of electromagnetic radiation to penetrate and heat an object in a rapid and effective manner has proven advantageous in many chemical and industrial processes. In the past, radio frequency (RF) energy has been used to heat articles by, for example, induction heating or dielectric heating. However, the use of RF energy to heat articles can have some drawbacks. For example, the wavelength of RF energy can make it difficult to transmit and launch RF energy in an efficient manner. The present invention involves discoveries for minimizing and/or eliminating many of the drawbacks conventionally associated with the use of RF energy to heat articles.

SUMMARY OF THE INVENTION

Certain embodiments of the present invention provide a radio frequency (RF) heating system that heats a plurality of articles with improved effectiveness and efficiency. The heating provided by the RF heating system can be used to pasteurize or sterilize the articles. The RF heating system can include the following components: (a) an RF generator for generating RF energy; (b) an RF waveguide configured to be substantially filled with a liquid and, when filled with the liquid, capable of transmitting RF energy produced by the RF generator; (c) an RF heating chamber configured to be substantially filled with the liquid and, when filled with the liquid, capable of receiving RF energy transmitted through the RF waveguide; and (d) a convey system received in the RF heating chamber and configured to convey the articles through the RF heating chamber while the articles are being heated by RF energy.

Other embodiments of the invention provide a process for heating articles using radio frequency (RF) energy. The RF heating process can include the following steps: (a) passing RF energy through an RF waveguide substantially filled with a liquid; (b) introducing RF energy into an RF heating chamber substantially filled with the liquid; and (c) heating articles conveyed through the RF heating chamber using RF energy.

BRIEF DESCRIPTION OF THE DRAWING FIGURES

DETAILED DESCRIPTION OF THE PREFERRED EMBODIMENTS

In many commercial processes, it can be desirable to heat large numbers of individual articles in a rapid and uniform manner. The present invention uses radio frequency (RF) energy to rapid and uniformly heat, or assist in heating, articles. Examples of suitable articles that can be heated in the RF heating system of the present invention can include, but are not limited to, foodstuffs, medical fluids, and medical instruments. In one embodiment, RF heating systems described herein can be used for the pasteurization or sterilization of the articles being heated. In general, pasteurization involves rapidly heating of an article or articles to a minimum temperature between 70° C. and 100° C., while sterilization involves heating one or more articles to a minimum temperature between 100° C. and 140° C., 110° C. and 135° C., or 120° C. and 130° C.

Figure 1:
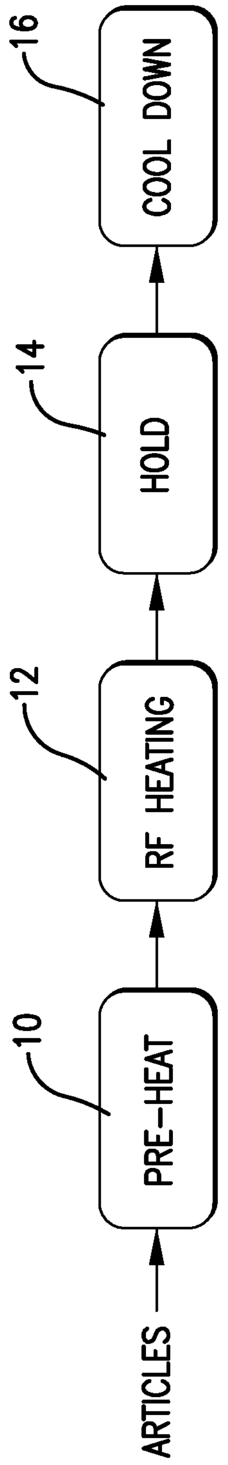
FIG. 1 is a block diagram of typical steps/zones of an RF heating system configured in accordance with embodiments of the present invention.

FIG. 1 is an overall diagram of an RF heating system configured in accordance with certain embodiments of the present invention. As shown in FIG. 1 one or more articles can initially be introduced into a pre-heat zone 10, wherein the articles can be pre-heated to a substantially uniform pre-heat temperature (e.g., 20° C. to 70° C.). Once pre-heated, the articles can be introduced into an RF heating zone 12. In the RF heating zone, the articles can be rapidly heated using RF energy discharged into at least a portion of the heating zone 12 by one or more RF launchers, described in further detail below. The heated articles can then, optionally, be passed through a holding zone 14, wherein the articles can be maintained at a constant temperature for a specified amount of time. Subsequently, the articles can then be passed to a cool down zone 16, wherein the temperature of the articles can be quickly reduced to a suitable handling temperature (e.g., 20° C. to 70° C.)

The RF heating system of FIG. 1 can be configured to heat many different types of articles. In one embodiment, the articles heated in the RF heating system can comprise foodstuffs, such as, for example, fruits, vegetables, meats, pastas, pre-made meals, and even beverages. In other embodiments, the articles heated in the RF heating system can comprise packaged medical fluids or medical and/or dental instruments. The articles processed within the RF heating system can be of any suitable size and shape. In one embodiment, each article can have a length (longest dimension) of at least about 2 inches, at least about 4 inches, at least about 6 inches and/or not more than about 18 inches, not more than about 12 inches, or not more than about 10 inches; a width (second longest dimension) of at least about 1 inch, at least about 2 inches, at least about 4 inches and/or not more than about 12 inches, not more than about 10 inches, or not more than about 8 inches; and/or a depth (shortest dimension) of at least about 0.5 inches, at least about 1 inch, at least about 2 inches and/or not more than about 8 inches, not more than about 6 inches, or not more than about 4 inches. The articles can comprise individual items or packages having a generally rectangular or prism-like shape or can comprise a continuous web of connected items or packages passed through the RF heating system. The items or packages may be constructed of any material, including plastics, cellulosics, and other substantially RF-transparent materials, and can be passed through the RF heating system via one or more conveyance systems, embodiments of which will be discussed in detail below.

According to one embodiment of the present invention, each of the above-described pre-heating, RF heating, holding, and/or cool down zones can be defined within a single vessel, while, in another embodiment, at least one of the above-described stages can be defined within one or more separate vessels. According to one embodiment, at least one of the above-described steps can be carried out in a vessel that is at least partially filled with a fluid medium in which the articles being processed can be at least partially submerged. The fluid medium can be a gas or a liquid having a dielectric constant greater than the dielectric constant of air and, in one embodiment, can be a liquid medium having a dielectric constant similar to the dielectric constant of the articles being processed. Such a liquid medium can have a dielectric constant at 20° C. of at least 40, 60, or 70 and/or not more than 120, 100, or 90. Water (or a liquid medium comprising water) may be particularly suitable for systems used to heat edible and/or medical devices or articles. In one embodiment, additives, such as, for example, oils, alcohols, glycols, and salts may optionally be added to the liquid medium to alter or enhance its physical properties (e.g., boiling point) during processing, if needed.

The RF heating system can include at least one conveyance system for transporting the articles through one or more of the processing zones described above. Examples of suitable conveyance systems can include, but are not limited to, plastic or rubber belt conveyors, chain conveyors, roller conveyors, flexible or multiflexing conveyors, wire mesh conveyors, bucket conveyors, pneumatic conveyors, screw conveyors, trough or vibrating conveyors, and combinations thereof. The conveyance system can include any number of individual convey lines and can be arranged in any suitable manner within the process vessels. The conveyance system utilized by the RF heating system can be configured in a generally fixed position within the vessel or at least a portion of the system can be adjustable in a lateral or vertical direction.

In the RF heating zone 12, the articles can be rapidly heated with a heating source that uses RF energy. As used herein, the term "RF energy" refers to electromagnetic energy having a frequency greater than 300 KHz and less than 300 MHz. In one embodiment, various configurations of the RF heating zone can utilize RF energy having a frequency of 50 to 150 MHz. In addition to RF energy, RF heating zone may optionally utilize one or more other heat sources such as, for example, conductive or convective heating or other conventional heating methods or devices. However, at least about 25 percent, about 50 percent, about 70 percent, about 85 percent, at least about 90 percent, at least about 95 percent, or substantially all of the energy used to heat the articles within the RF heating zone 12 can be RF energy from an RF energy source. In certain embodiments, less than 50 percent, less than 25 percent, less than 10 percent, less than 5 percent or substantially none of the energy used to heat the articles in the RF heating zone is provided by electromagnetic radiation having a frequency greater than 300 MHz.

According to one embodiment, the RF heating zone 12 can be configured to increase the temperature of the articles above a minimum threshold temperature. In one embodiment wherein RF system is configured to sterilize a plurality of articles, the minimum threshold temperature (and operating temperature of the RF heating zone 12) can be at least about 120° C., at least about 121° C., at least about 122° C. and/or not more than about 130° C., not more than about 128° C., or not more than about 126° C. The RF heating zone 12 can be operated at approximately ambient pressure, or it can include one or more pressurized RF chambers operated at a pressure of at least about 5 psig, at least about 10 psig, at least about 15 psig and/or not more than about 80 psig, not more than about 60 psig, or not more than about 40 psig. In one embodiment, the pressurized RF chamber can be a liquid-filled chamber having an operating pressure such that the articles being heated can reach a temperature above the normal boiling point of the liquid medium employed therein.

The articles passing through the RF heating zone 12 can be heated to the desired temperature in a relatively short period of time, which, in some cases, may minimize damage or degradation of the articles. In one embodiment, the articles passed through the RF heating zone 12 can have an average residence time of at least about 5 seconds, at least about 20 seconds, at least about 60 seconds and/or not more than about 10 minutes, not more than about 8 minutes, or not more than about 5 minutes. In the same or other embodiments, the RF heating zone 12 can be configured to increase the average temperature of the articles being heated by at least about 20° C., at least about 30° C., at least about 40° C., at least about 50° C., at least about 75° C. and/or not more than about 150° C., not more than about 125° C., or not more than about 100° C., at a heating rate of at least about 15° C. per minute (° C./min), at least about 25° C./min, at least about 35° C./min and/or not more than about 75° C./min, not more than about 50° C./min, or not more than about 40° C./min.

Figure 2:
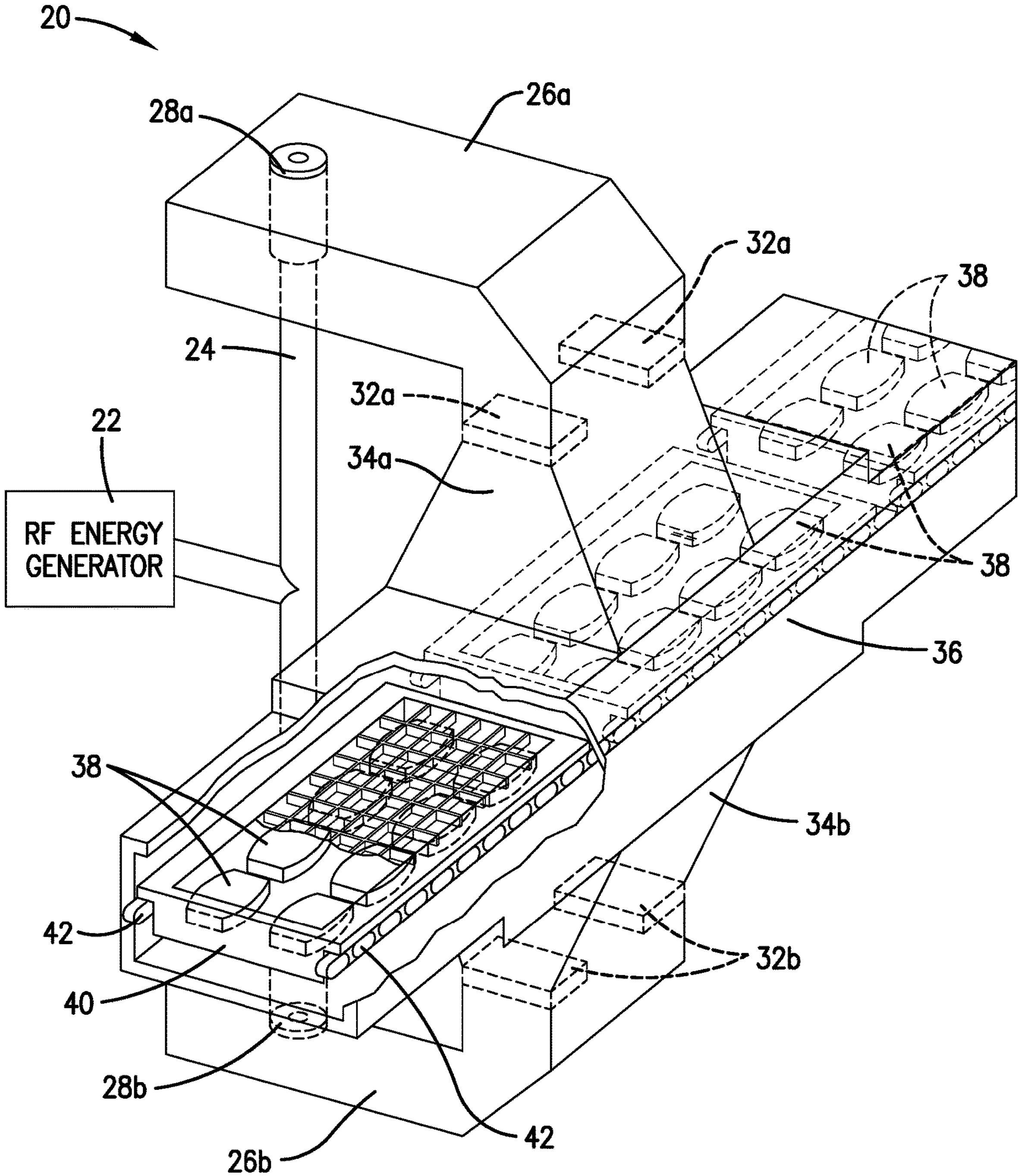
FIG. 2 is a cutaway isometric view of a portion of an RF heating zone configured in accordance with one embodiment of the present invention, particularly illustrating how opposing launchers are used to apply RF energy to packages that are conveyed through the heating chamber.
Figure 3:
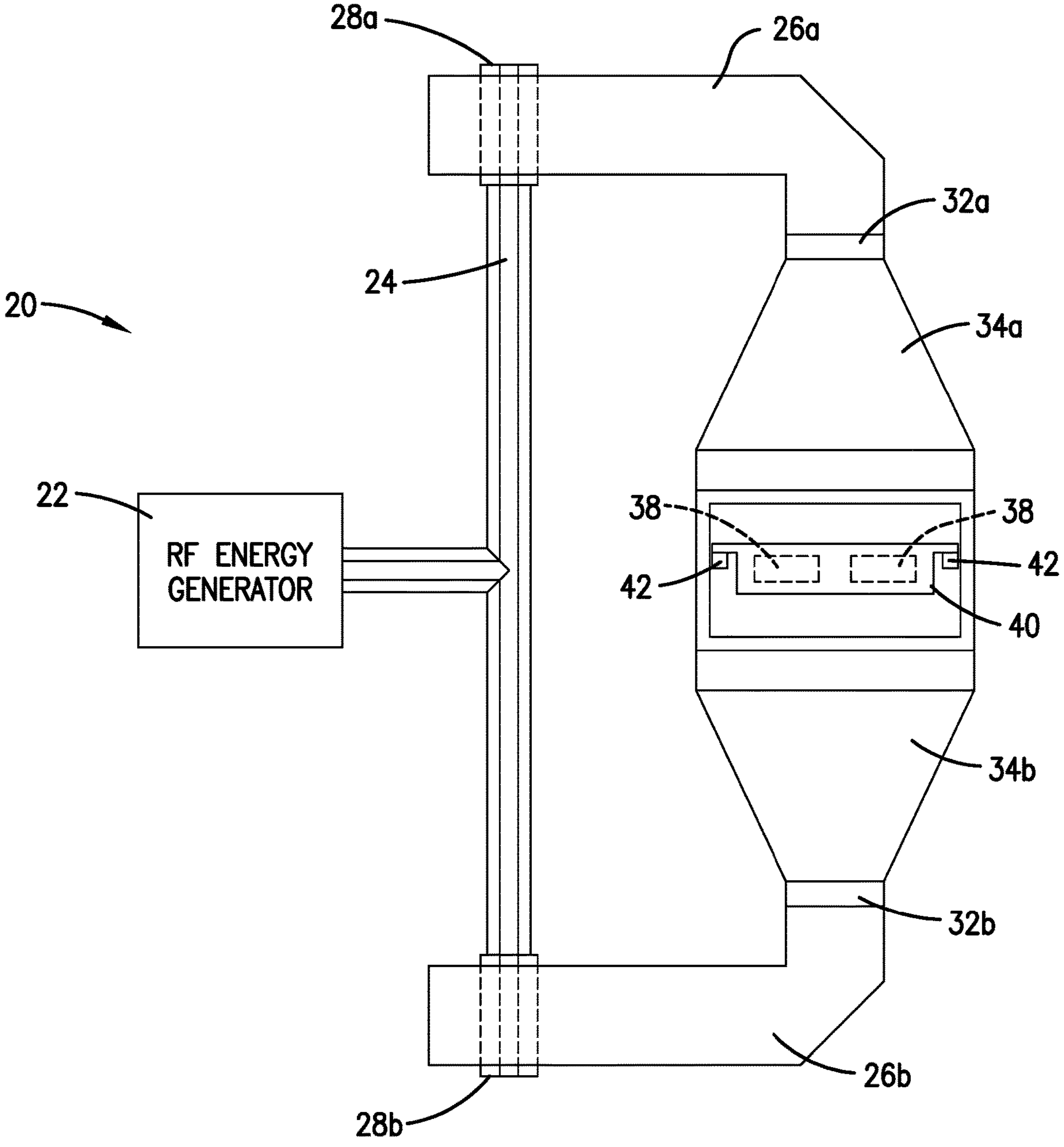
FIG. 3 is an end view of the RF heating zone of FIG. 2.

FIGS. 2 and 3 provide isometric and side views, respectively, of one embodiment of an RF heating zone 20 where RF energy is produce in an RF energy generator 22, transferred from the RF generator 22 via a coaxial conductor 24, transferred into upper and lower water-filled waveguides 26*a,b* using upper and lower a coax-to-waveguide transitions 28*a,b*, transferred through the water-filled waveguides 26*a,b*, past optional inductive irises 32*a,b* and into upper and lower water-filled launchers 34*a,b*, transferred out of the upper and lower water-filled launchers 34*a,b* and into the water-filled RF heating chamber 36. In the RF heating chamber 36, the RF energy heats articles 38 (e.g., food packages) as they move along on a convey system that can include carriers 40 and a chain drive 42. Although FIG. 2 only shows one pair of launchers 34*a,b*, being used, it should be understood that two or more spaced apart pairs of launchers can be used.

The coaxial conductor 24 includes an outer conductor and an inner conductor. As perhaps best illustrated in FIG. 3, the outer conductor terminates at the wall of the waveguide 26, while the center conductor extends through one wall of the waveguide 26, into the interior of the waveguide 26, and to (or through) the opposite wall of the waveguide 26. A dielectric sleeve surrounds the center conductor where the center conductor penetrates the wall(s) of the waveguide 26. This dielectric sleeve acts as a barrier to prevent liquid from passing from the interior of the waveguide 26 into the coaxial conductor 24. The dielectric sleeve can be made a material that is capable of being readily sealed with the waveguide 26 and is substantially microwave transparent. In one embodiment, the dielectric sleeve can be formed of a glass fiber filled polytetrafluoroethylene (PTFE) material.

It has been discovered, that by filling the waveguides 26, launchers 34, and RF heating chamber 36 with a liquid having a dielectric constant closer to water than air, RF energy can be more efficiently and effectively transmitted to the articles 38 being heated. The liquid filling the waveguides 26, launchers 34, and RF heating chamber 36 acts as a transfer medium through which the RF energy is transferred as it is directed from the coax-to-waveguide transitions 28*a,b* to the articles. The liquid filling the waveguides 26, launchers 34, and RF heating chamber 36 can be pretreated to minimize its conductivity. It is preferred for the conductivity of the liquid (e.g., water) to be less than 100 mS/m, less than 50 mS/m, less than 10 mS/m, less than 5 mS/m, or less than 0.5 mS/m. In certain embodiments, distilled water or deionized water can be used to fill the waveguides 26, launchers 34, and RF heating chamber 36.

The waveguides 26, launchers 34, and RF heating chamber 36 can be open to one another, thereby permitting the liquid contained in the waveguides 26, launchers 34, and RF heating chamber 36 to be shared by each other. However, the waveguides 26, launchers 34, and RF heating chamber are part of a sealed system that does not allow the liquid to leak out of the RF heating zone—although the RF heating system may include a system for recirculating and/or replacing the liquid in the RF heating zone.

The waveguides 26, launchers 34, and RF heating chamber 36 may contain small amounts of air. However, it is preferable for substantially all of the interior volume of the waveguides 26, launchers 34, and RF heating chamber 36 to be will with a liquid, such as water. Thus, at least 75, 90, 95, 99, or 100 percent of the interior volume of the waveguides 26, launchers 34, and RF heating chamber 36 can be fill with a liquid.

Having the waveguides 26, launchers 34, and RF heating chamber 36 filled with a liquid, such as water, allows the dimensions of these components to be much smaller than they would be if the waveguides 26, launchers 34, and RF heating chamber 36 were filled with air. For example, the waveguides carrying the RF energy can have a generally rectangular cross-section, with the dimension of the widest waveguide wall being in the range of 5 to 40 inches, 10 to 30 inches, or 12 to 20 inches and the dimension of the narrowest waveguide wall being in the range of 2 to 20 inches, 4 to 12 inches, or 6 to 10 inches.

Using RF energy to heat the articles 38 can provide deep penetration of the energy into the articles 38 being processed, can minimize the number of required launchers 34, and can provide high field uniformity for more even heating.

Figure 4:
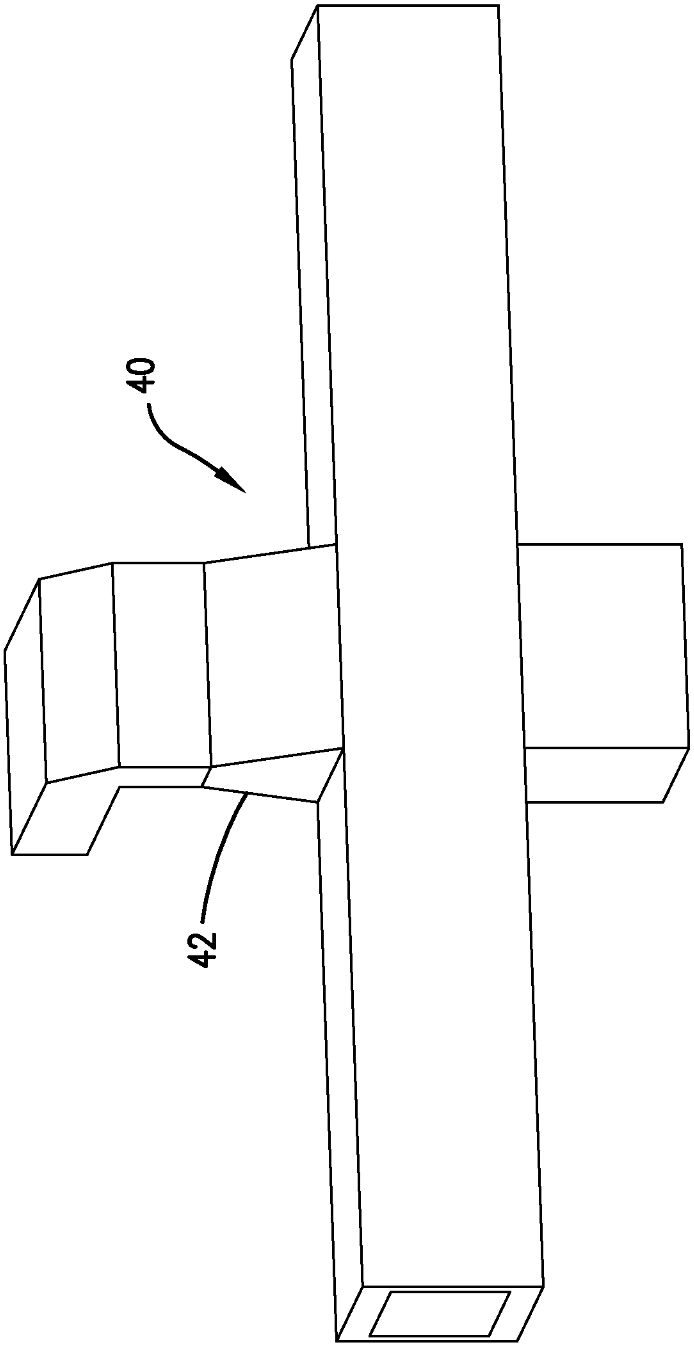
FIG. 4 shows an RF heating zone using a single-sided launcher to apply RF energy to articles.
Figure 5:
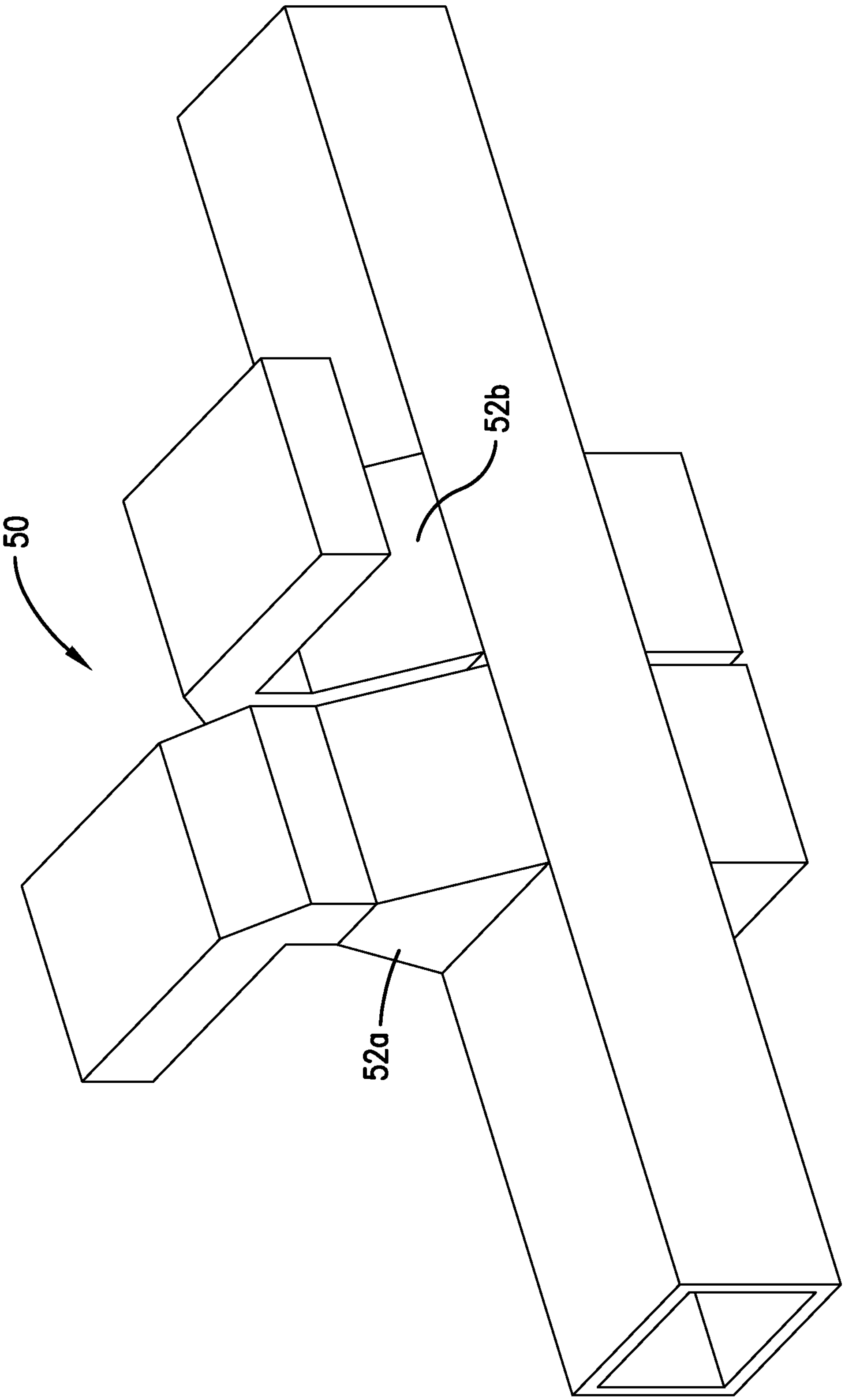
FIG. 5 shows an RF heating zone using two, adjacent, single-sided launchers on the same side of the chamber to apply RF energy to articles.
Figure 6:
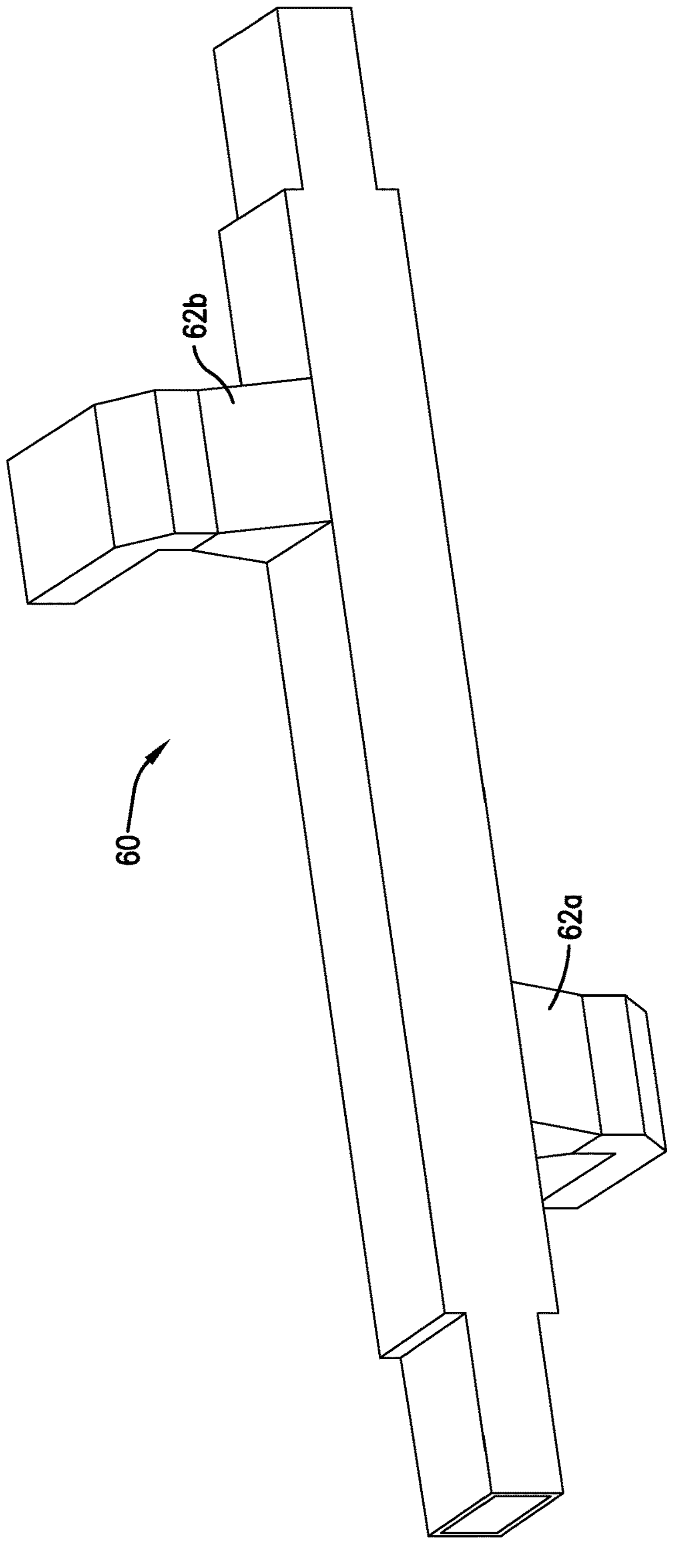
FIG. 6 shows an RF heating zone using two, spaced-apart, single-sided launchers on opposite sides of the chamber to apply RF energy to the articles.

FIG. 4 illustrates an alternative RF heating zone 40 employing a single-sided launcher 42. FIG. 5 illustrates an alternative RF heating zone 50 employing single-sided, adjacent launchers 50*a,b*, both on the same side of the chamber. FIG. 6 illustrates an alternative RF heating zone 60 having single-sided, spaced-apart launchers 62*a,b* on opposite sides of the cavity.

Figure 7:
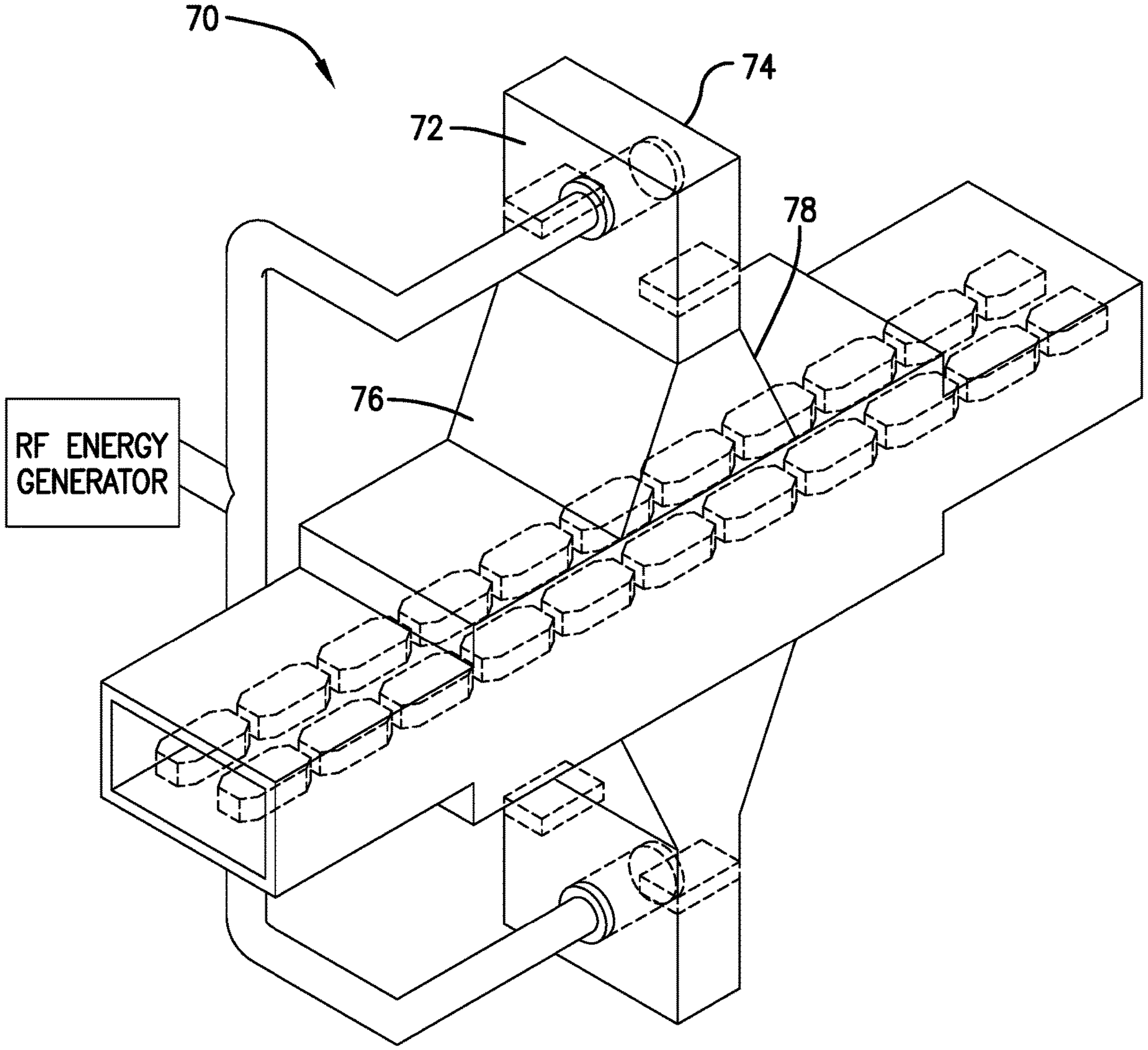
FIG. 7 is an isometric view of an RF heating zone using opposing launchers oriented such that the broadest wall of the launcher is perpendicular to the direction of travel of the articles.
Figure 8:
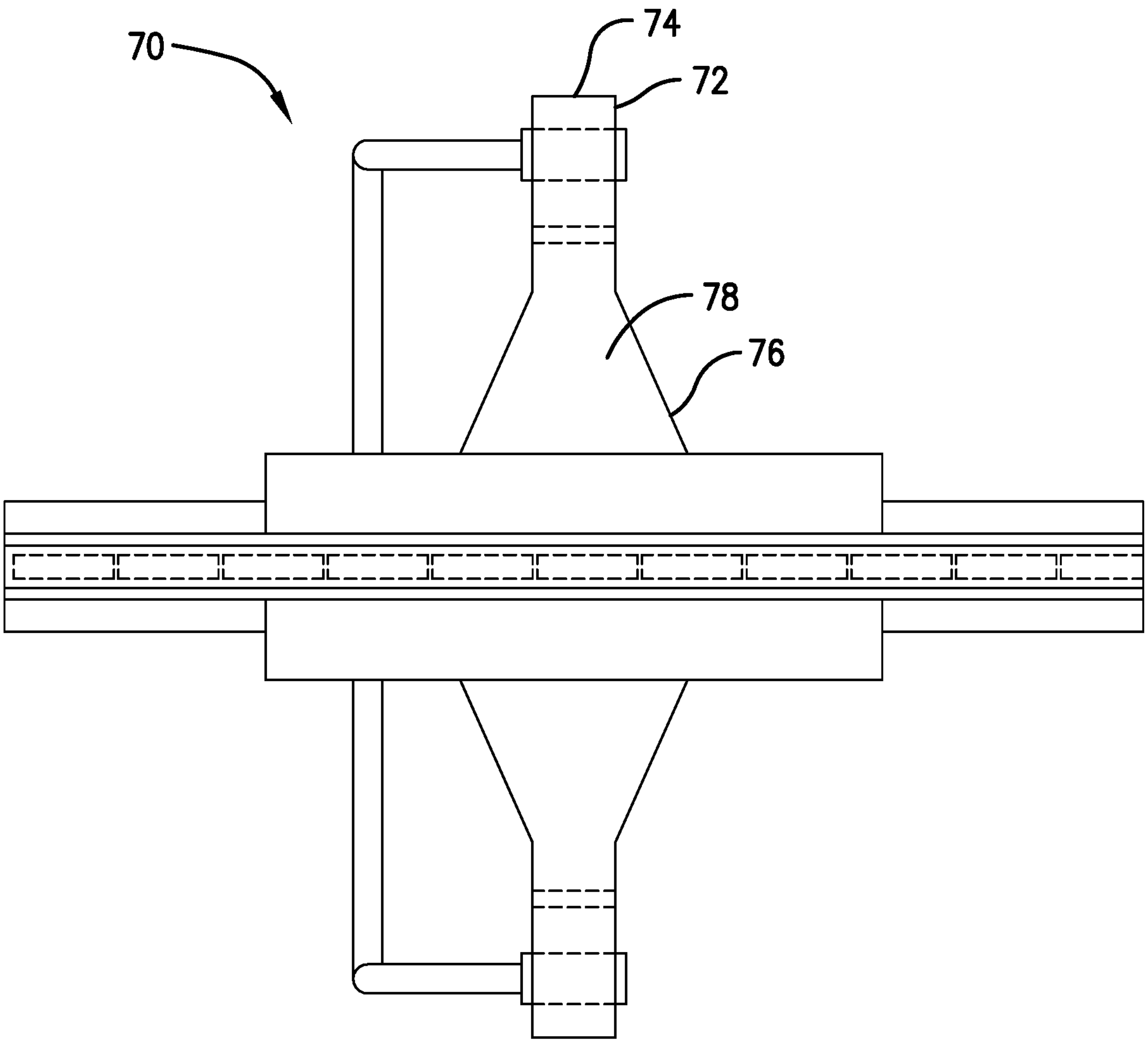
FIG. 8 is a side view of the RF heating zone of FIG. 7.
Figure 9:
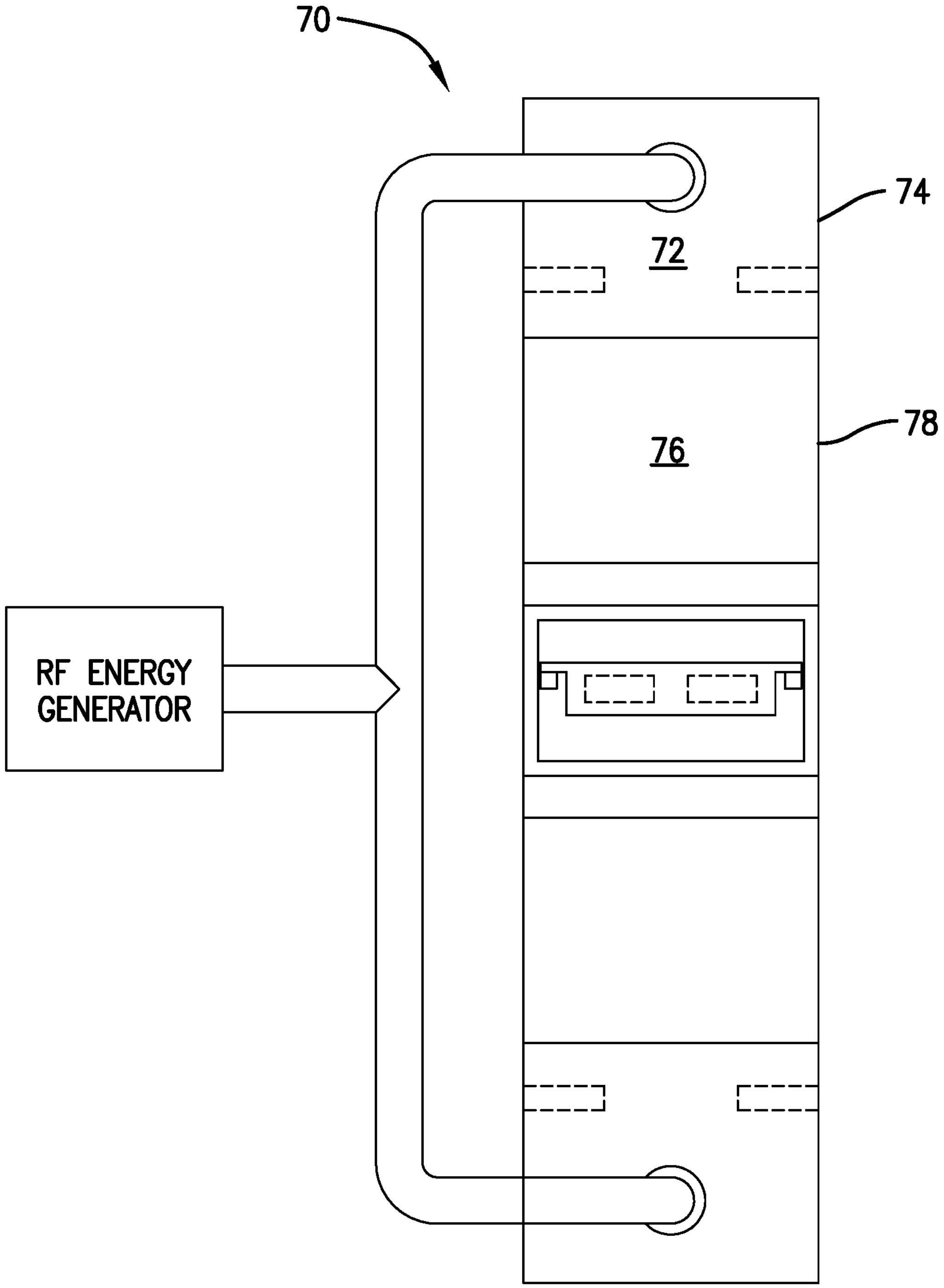
FIG. 9 is an end view of the RF heating zone of FIG. 8.

FIGS. 7, 8, and 9 provide isometric, side, and end views, respectively, of an RF heating zone 70 where the broadest wall 72 of the RF waveguide 74 and the broadest wall 76 of the RF launcher 78 are perpendicular to the axis of propagation of the articles on the convey system. This orientation of the RF waveguide and/or RF launcher has been shown to enhance field uniformity.

Figure 10:
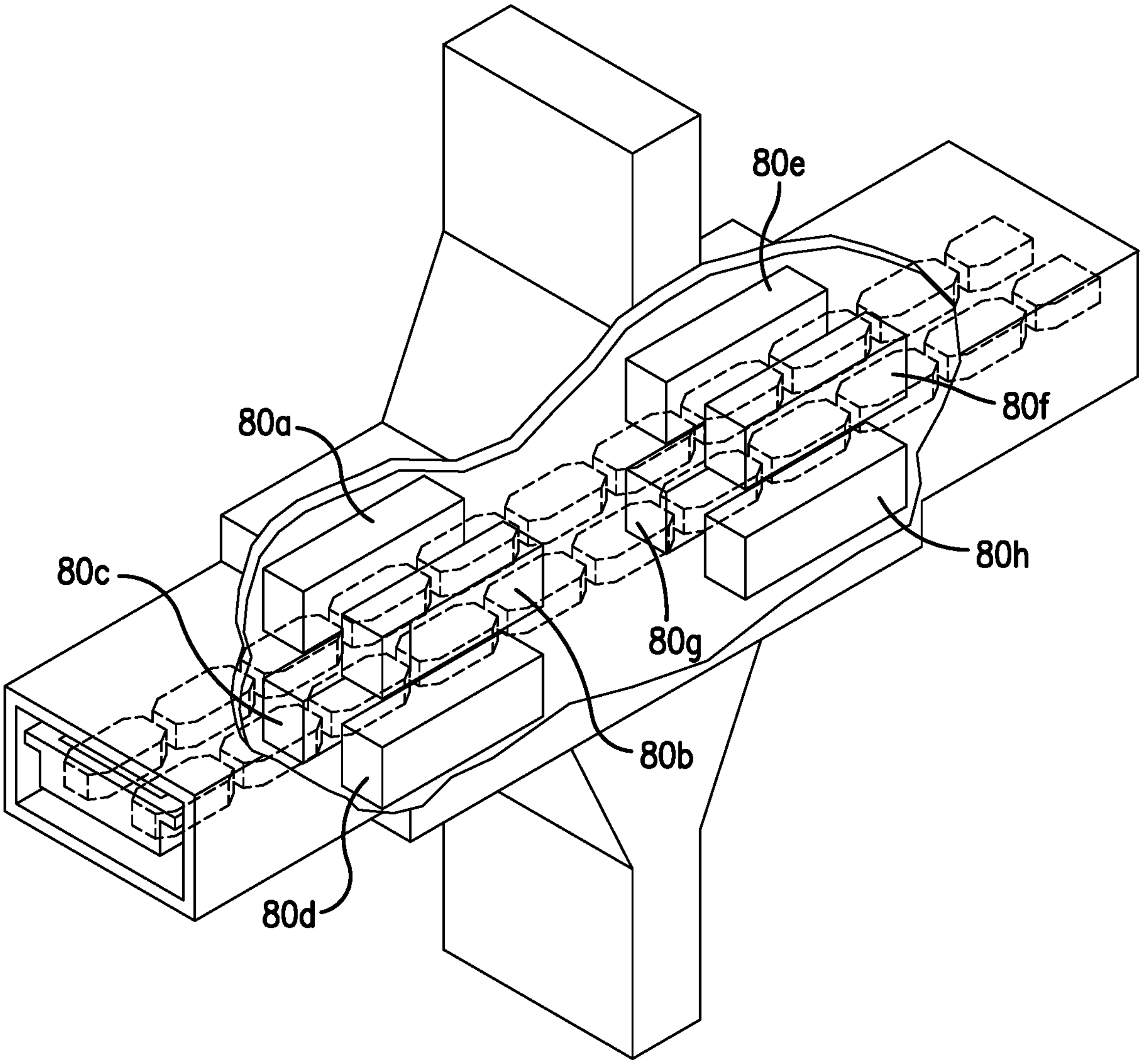
FIG. 10 is a cutaway isometric view of an RF heating zone equipped with a plurality of dielectric field shapers.
Figure 11:
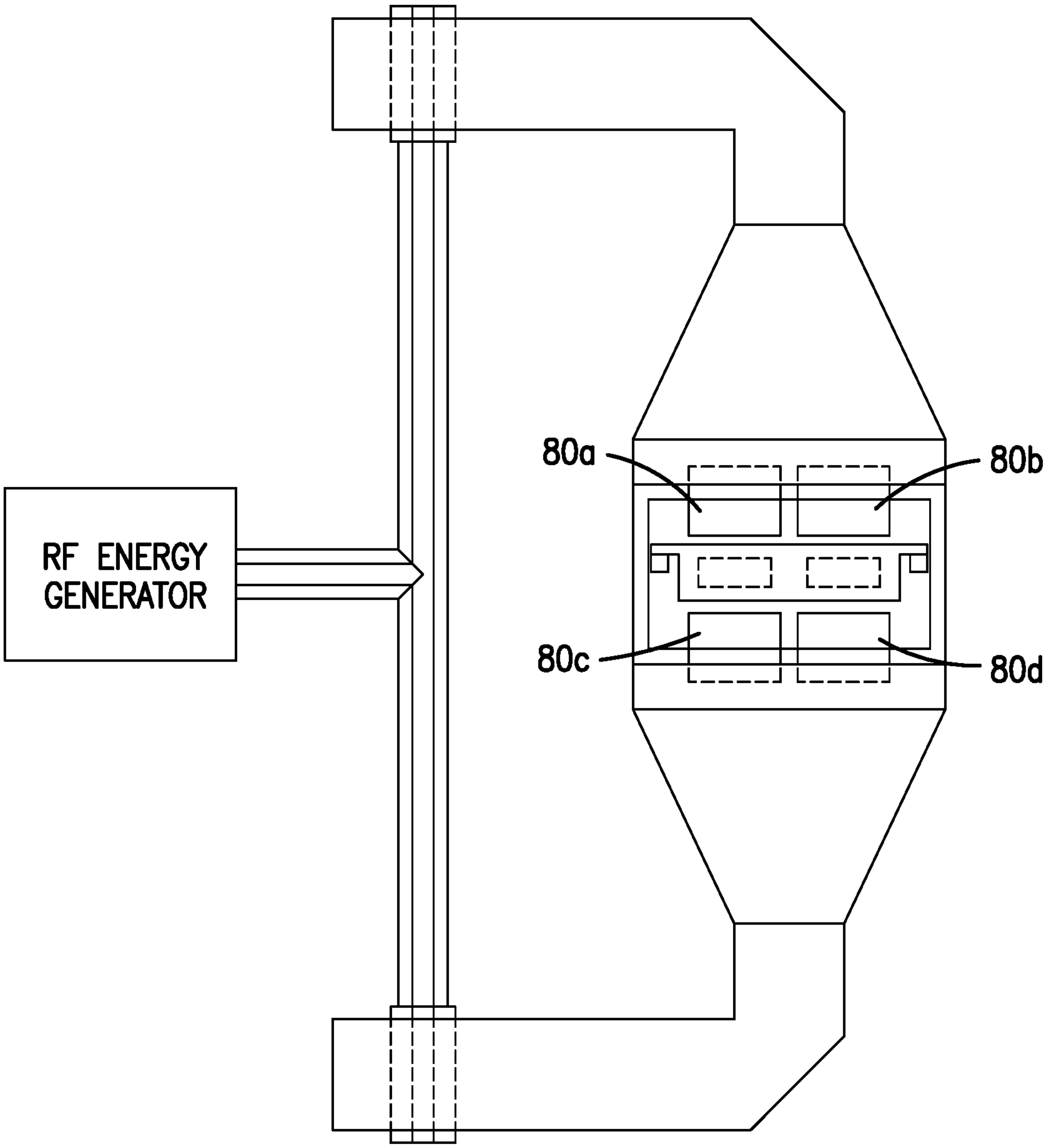
FIG. 11 is a cross-sectional view of the RF heating zone of FIG. 10.

FIGS. 10 and 11 illustrate optional dielectric field shapers 80*a,b,c,d,e,f,g,h* used to enhance field uniformity in the RF heating chamber so as to prevent large temperature gradients in the heated articles. The dielectric field shapers can be formed of a material that absorbs little RF energy and has a dielectric constant different than the water that fills the RF heating chamber. For example, the dielectric constant of the dielectric field shapers can be less than 20, less than 10, less than 5, or less than 2.5.

Figure 12:
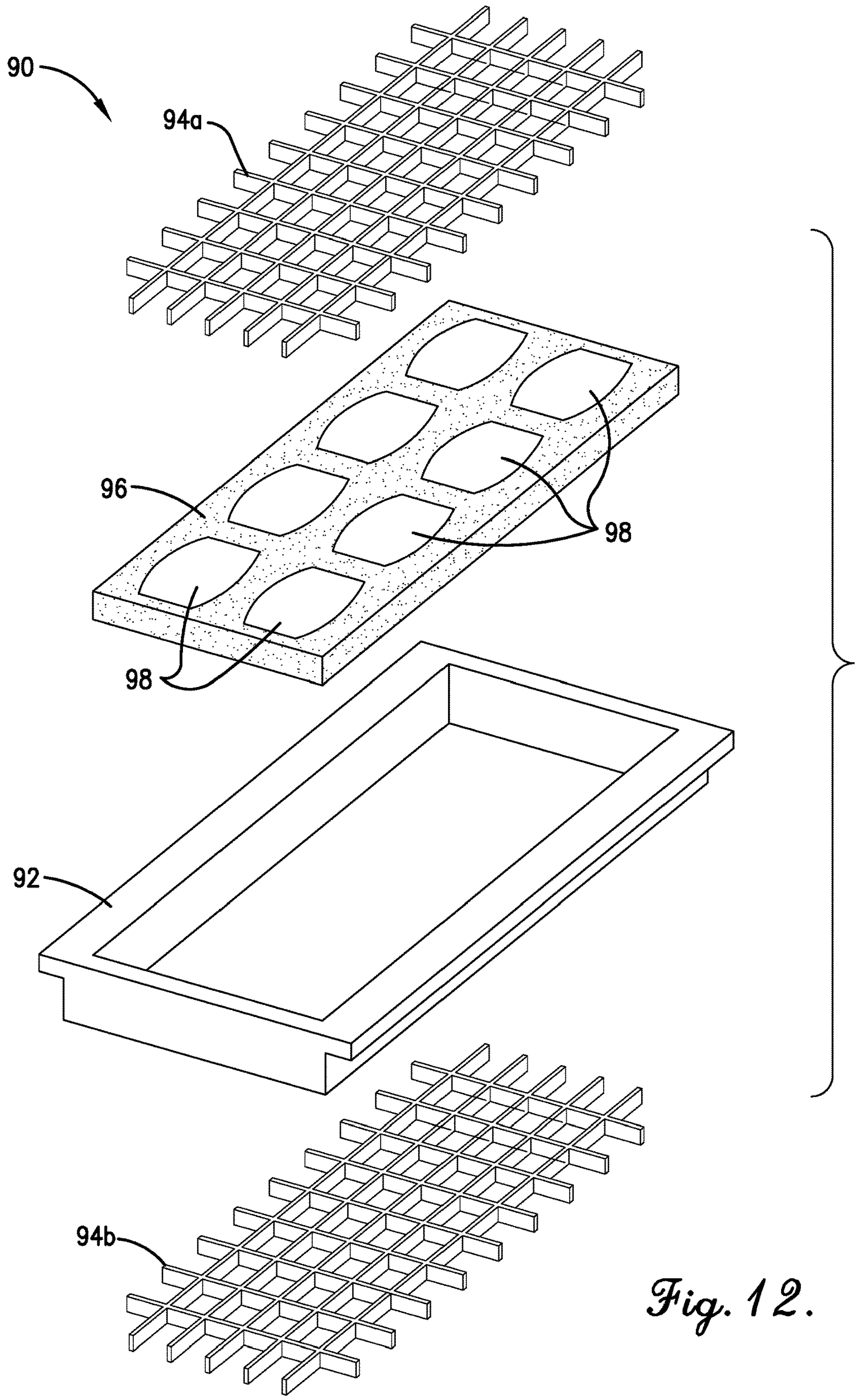
FIG. 12 is an exploded isometric view of a carrier equipped with a dielectric nesting system for receiving the articles to be heated in the RF heating zone.
Figure 13:
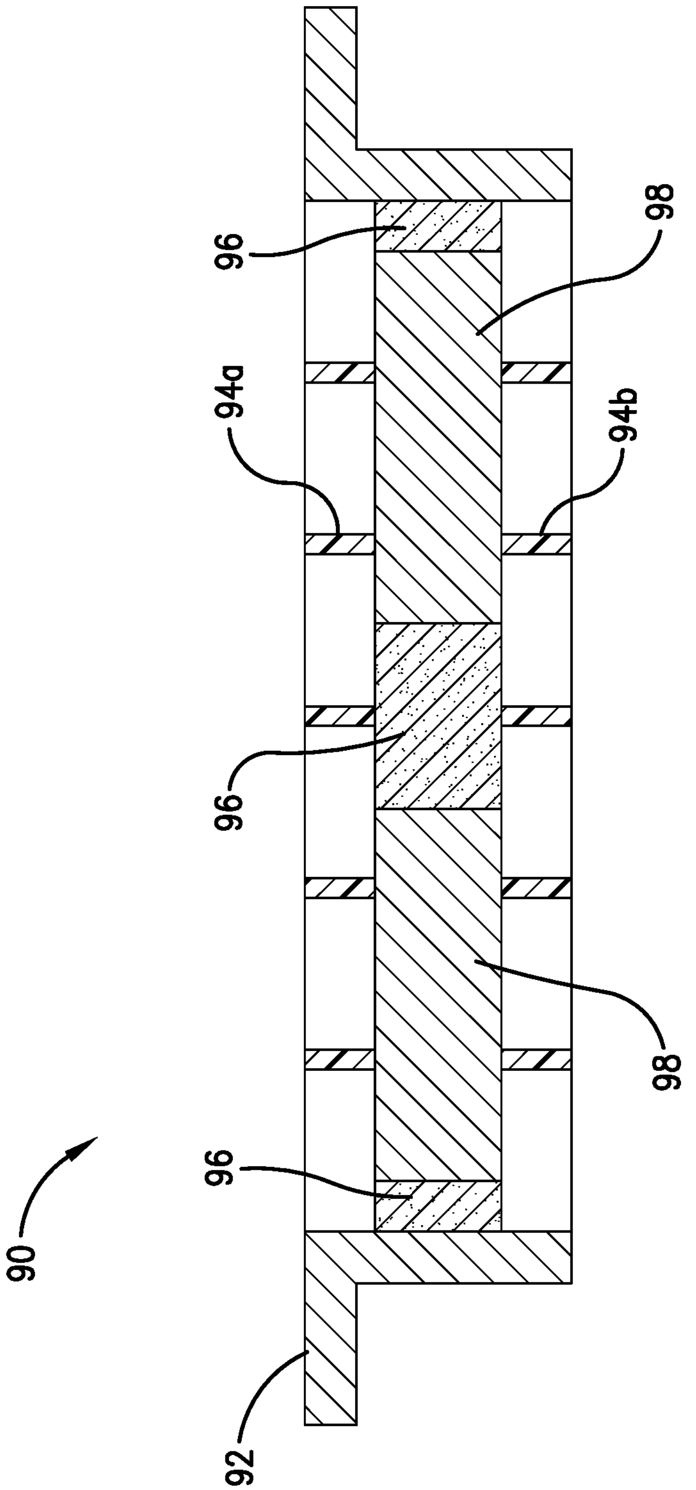
FIG. 13 is a cross-sectional view of the carrier of FIG. 12.

FIGS. 12 and 13 show a carrier 90 that includes an outer frame 92, upper and lower retention grids 94*a,b*, and a dielectric nest 96. The dielectric nest 96 includes a plurality of openings for receiving the individual articles 98 being heated. The dielectric nest 96 substantially fills the voids between the individual articles 94. It is preferred for the dielectric constant of the dielectric nest 96 to be substantially similar to the dielectric constant of the articles 98 being heated. For example, the dielectric constant of the dielectric nest 96 can be within 50%, within 25%, within 10%, or within 5% of the dielectric constant of the articles 98 being heated. In certain embodiments, the dielectric nest 98 has a dielectric constant at 20° C. of at least 2, 10, 20, 40 or 60 and/or not more than 160, 120, 100, or 90.

RF heating systems of the present invention can be commercial-scale heating systems capable of processing a large volume of articles in a relatively short time. RF heating systems as described herein can be configured to achieve an overall production rate of at least about 2 packages per minute per convey line, at least 15 packages per minute per convey line, at least about 20 packages per minute per convey line, at least about 75 packages per minute per convey line, or at least about 100 packages per minute per convey line.

As used herein, the term "packages per minute" refers to the total number of whey gel-filled 8-oz MRE (meals ready to eat) packages able to be processed by an RF heating system, according to the following procedure: An 8-oz MRE package filled with whey gel pudding commercially available from Ameriqual Group LLC (Evansville, Ind., USA) is connected to a plurality of temperature probes positioned in the pudding at five equidistant locations spaced along each of the x-, y-, and z-axes, originating from the geometrical center of the package. The package is then placed in an RF heating system being evaluated and is heated until each of the probes registers a temperature above a specified minimum temperature (e.g., 120° C. for sterilization systems). The time required to achieve such a temperature profile, as well as physical and dimensional information about the heating system, can then be used to calculate an overall production rate in packages per minute.

The preferred forms of the invention described above are to be used as illustration only, and should not be used in a limiting sense to interpret the scope of the present invention.

Obvious modifications to the exemplary one embodiment, set forth above, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

The invention claimed is:

1. A process for sterilizing one or more packaged foodstuffs, said process comprising:

(a) pre-heating said one or more packaged foodstuffs to a substantially uniform preheat temperature, thereby providing one or more pre-heated packaged foodstuffs;

(b) transmitting radio frequency (RF) energy through a liquid medium and toward an RF heating zone, wherein said RF energy has a frequency greater than 300 kHz and less than 300 MHz;

(c) heating said one or more pre-heated packaged foodstuffs in said RF heating zone to a heating temperature above a minimum threshold temperature, thereby providing one or more RF heated packaged foodstuffs, wherein at least a portion of the RF heating is provided by the RF energy transmitted through said liquid medium, wherein the minimum threshold temperature is a minimum sterilization threshold temperature of at least 120° C.;

(d) holding the temperature of said one or more RF heated packaged foodstuffs at a relatively constant hold temperature, thereby providing one or more sterilized packaged foodstuffs; and (e) cooling said sterilized packaged foodstuffs to a handling temperature, thereby providing one or more cooled and sterilized packaged foodstuffs.

2. The process of claim 1, wherein said heating is carried out in a different zone than said pre-heating, said holding, and said cooling.

3. The process of claim 1, wherein said pre-heating, said heating, said holding, and said cooling are all carried out in different zones.

4. The process of claim 1, wherein said RF heating zone is substantially filled with said liquid medium.

5. The process of claim 1, wherein said transmitting includes passing said RF energy through at least one of an RF waveguide and an RF launcher.

6. The process of claim 5, wherein at least one of said RF waveguide and said RF launcher is substantially filled with the liquid medium, wherein said liquid medium comprises water.

7. The process of claim 1, wherein said transmitting includes passing said RF energy through an RF waveguide and an RF launcher, wherein said RF waveguide and said RF launcher are both substantially filled with the liquid medium, wherein said liquid medium comprises water.

8. The process of claim 7, wherein said heating zone is substantially filled with said liquid medium.

9. The process of claim 1, wherein said pre-heat temperature is in the range of 20° C. to 70° C., wherein said minimum sterilization threshold temperature is at least 121° C., wherein said hold temperature is above said minimum threshold temperature, and wherein said handling temperature is not more than 70° C.

10. The process of claim 1, wherein said heating temperature is in the range of 121° C. to 130° C.

11. The process of claim 1, wherein said heating increases the average temperature of said packaged foodstuffs by at least 20° C. in less than 10 minutes.

12. The process of claim 1, wherein said heating increases the average temperature of said packaged foodstuffs by at least 50° C. in less than 5 minutes.

13. The process of claim 1, further comprising placing a plurality of said packaged foodstuffs in a carrier, wherein said pre-heating, said heating, said holding, and said cooling are carried out while said plurality of packaged foodstuffs are received in said carrier.

14. The process of claim 13, further comprising conveying said carrier through a pre-heating zone where said pre-heating is carried out, said RF heating zone, a holding zone where said holding is carried out, and a cooling zone where said cooling is carried out.

* * * * *